(12) United States Patent
Alamdari et al.

(10) Patent No.: US 12,270,117 B2
(45) Date of Patent: Apr. 8, 2025

(54) PROCESS FOR MANUFACTURING CARBON ANODES FOR ALUMINIUM PRODUCTION CELLS AND CARBON ANODES OBTAINED FROM THE SAME

(71) Applicants: UNIVERSITÉ LAVAL, Québec (CA); ALCOA USA CORP., Pittsburgh, PA (US)

(72) Inventors: Houshang Alamdari, Québec (CA); Ramzi Ishak, Québec (CA); Gaétan Laroche, Québec (CA); Mario Fafard, St Augustin de Desmaures (CA); Donald Picard, Deschambault-Grondines (CA); Donald Ziegler, Lower Burrell, PA (US)

(73) Assignees: UNIVERSITÉ LAVAL, Québec (CA); ALCOA USA CORP., Pittsburgh, PA (US)

( * ) Notice: Subject to any disclaimer, the term of this patent is extended or adjusted under 35 U.S.C. 154(b) by 1612 days.

(21) Appl. No.: 16/477,323

(22) PCT Filed: Jan. 12, 2018

(86) PCT No.: PCT/CA2018/050026
§ 371 (c)(1),
(2) Date: Jul. 11, 2019

(87) PCT Pub. No.: WO2018/129621
PCT Pub. Date: Jul. 19, 2018

(65) Prior Publication Data
US 2019/0390355 A1    Dec. 26, 2019

Related U.S. Application Data

(60) Provisional application No. 62/445,308, filed on Jan. 12, 2017.

(51) Int. Cl.
*C04B 35/532* (2006.01)
*C04B 35/628* (2006.01)
(Continued)

(52) U.S. Cl.
CPC .............. *C25C 7/02* (2013.01); *C04B 35/532* (2013.01); *C04B 35/62805* (2013.01);
(Continued)

(58) Field of Classification Search
CPC ......... C25C 7/02; C25C 3/125; C04B 35/532; C04B 35/62886; C04B 2235/3409; C04B 2235/422
See application file for complete search history.

(56) References Cited

U.S. PATENT DOCUMENTS 3,174,872 A * 3/1965 Fisher .................... H05B 7/085
                                                        501/99
4,439,382 A    3/1984 Joo et al.
(Continued)

FOREIGN PATENT DOCUMENTS

CA    2161541 C    9/1999
CA    2682044 A1   4/2010
(Continued)

OTHER PUBLICATIONS

International Search Report and Written Opinion for Application No. PCT/CA2016/050552 reported on Apr. 14, 2018.

*Primary Examiner* — Noah S Wiese
(74) *Attorney, Agent, or Firm* — von Briesen & Roper, s.c.

(57) ABSTRACT

There is provided a process for manufacturing a carbonaceous anode for an electrolysis cell for the production of aluminium. The process comprises contacting coke particles with a boron-containing solution to obtain boron-impregnated coke particles, mixing the boron-impregnated coke
(Continued)

particles with coal tar pitch to form an anode paste, and forming a green anode with the anode paste. A carbonaceous anode for an electrolysis cell for the production of aluminium is also provided, which comprises at least a first fraction of coke particle, a second fraction of coke particles and coal tar pitch, wherein at least the first faction of coke particles comprises boron-impregnated coke particles, the boron-impregnated coke particles being distributed throughout the carbonaceous anode. The carbonaceous anode presents good resistivity towards air and $CO_2$ oxidation, which translates into less dusting of the anode, thus improving its integrity throughout its lifetime.

20 Claims, 5 Drawing Sheets

(51) Int. Cl.
C25C 3/12 (2006.01)
C25C 7/02 (2006.01)

(52) U.S. Cl.
CPC ........ *C04B 35/62886* (2013.01); *C25C 3/125* (2013.01); *C04B 2235/3409* (2013.01); *C04B 2235/422* (2013.01); *C04B 2235/5427* (2013.01); *C04B 2235/5436* (2013.01); *C04B 2235/5472* (2013.01); *C04B 2235/726* (2013.01); *C04B 2235/77* (2013.01)

(56) References Cited

U.S. PATENT DOCUMENTS 4,445,996 A * 5/1984 Kawamata ............... C25C 3/125
　　　　　　　　　　　　　　　　　　　　204/294
5,753,382 A * 5/1998 Sekhar .................... C04B 41/89
　　　　　　　　　　　　　　　　　　　　427/113

FOREIGN PATENT DOCUMENTS

WO　　WO-9428200 A1 * 12/1994　......... C04B 41/5006
WO　　WO-2010040231 A1 * 4/2010　............. C25C 3/125

* cited by examiner

PROCESS FOR MANUFACTURING CARBON ANODES FOR ALUMINIUM PRODUCTION CELLS AND CARBON ANODES OBTAINED FROM THE SAME

CROSS-REFERENCE TO RELATED APPLICATION

This Application is a 35 USC § 371 US National Stage filing of International Application No. PCT/CA2018/050026 filed on Jan. 12, 2018, and claims priority under the Paris Convention to U.S. Provisional Patent Application No. 62/445,308 filed on Jan. 12, 2017.

TECHNICAL FIELD

The technical field generally relates to carbon anodes for electrolysis cell for the production of aluminium and to a process for manufacturing such carbon anodes. The technical field also relates to a process for pre-treating coke particles used in the manufacturing of carbon anodes.

BACKGROUND

Air and $CO_2$ reactivities of carbonaceous anodes represent a great technico-economical interest in aluminium smelting through the Hall-Héroult process. In this process carbon blocks, acting as anodes, are partially immersed into molten cryolite at 960° C., acting as electrolyte. The alumina, dissolved in cryolite, is thus reduced to molten aluminium and the anode is electrochemically oxidized, generating $CO_2$. The overall electrolysis reaction can be represented by Equation (1):

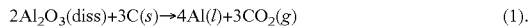

$$2Al_2O_3(diss) + 3C(s) \rightarrow 4Al(l) + 3CO_2(g) \qquad (1).$$

The $CO_2$ generated by the electrochemical reaction is in contact with the anode surface and may diffuse into the porous structure of the anode and further react with carbon through the Boudouard reaction, causing carbon overconsumption and anode disintegration. In addition, the upper part of the anode, being in contact with air at high temperature, may react with the oxygen of the air and be consumed uselessly.

The anodes used in aluminium smelting process are made by mixing petroleum coke with coal tar pitch (binder) to form a paste with a doughy consistency. Recycled anode butts are also used as filler aggregates and added to the mixture of coke and pitch. The resulting paste is then vibro-compacted or pressed, during which it is deformed and densified, forming a so-called "green anode". The green anode is then baked at high temperature around 1200° C.

Two size ranges of coke may typically be used to make anode paste: large fraction (0.15-9.5 mm) and fine fraction (<0.15 mm), also called fine coke. During mixing, fine cokes are embedded into the liquid pitch resulting in a viscous material, also called "binder matrix", surrounding the larger coke aggregates. During the baking process, coal tar pitch is pyrolyzed and plays the role of cement in order to bind together the coke and butt particles, providing a solid block.

The anode is consumed during the electrolysis process and lasts only for about 25 days in the pot. After this period, it has to be replaced by a new one. Theoretically, 334 kg of carbon would be required to produce one ton of aluminium. However, the actual consumption of carbon is roughly about 415 kg per ton of aluminium, representing 25% overconsumption, which could be mainly attributed to: A) direct production of CO during the electrolysis, B) the reversibility of Equation (1), and C) the gasification of the anodes by air and $CO_2$.

The baked anode which is composed of large coke aggregates, fine coke particles and pyrolyzed pitch, contains porosity. Oxidation of carbon by oxygen and $CO_2$ results in anode air and $CO_2$ burning. It has been observed that the burning rate of the binder matrix (mixture of pitch and fine coke) is higher than that of the large coke grains. In addition to the direct overconsumption of carbon, high reactivity of the binder matrix may result in early removal of the matrix and detachment of the unburned coke grains from the anode surface, contributing to the anode disintegration, the so-called dusting phenomenon.

Several efforts have been made to try to limit the dusting problem and to maintain, as far as possible, integrity of anodes throughout their life. For example, it has been proposed to provide an impermeable physical barrier on the anode external surface. The barrier can consist of a coating of an alumina-based material, which can be sprayed on the baked anode. Alternatively, the anode can be covered by alumina powder and/or crushed frozen electrolyte. Another conventional strategy to avoid binder matrix reactivity is to cover anodes by spreading liquid bath on fresh anode just after it is changed. The liquid bath solidifies immediately on the cold anode surface, providing a coating, which decreases the anode air-burning rate. However, although they may reduce air-burning rate by generating an oxygen diffusion layer around the anode, both alumina powder and solidified bath are porous media, and anode protection using such coatings has not proved to be fully effective.

Another strategy to protect carbon is to decrease its intrinsic reactivity. This can be accomplished by either decreasing the content of catalytic materials or by adding reaction inhibitors. This approach has been used especially in graphite composite fields. The oxidation inhibition is basically achieved by doping graphite with chemicals such as phosphorus and boron. It has been shown that boron doping can effectively limit graphite oxidation.

Three mechanisms have been proposed to explain the effect of boron on graphite oxidation. The first proposed mechanism is the inhibition of the oxidation reaction by re-distribution of electron densities on graphite, hence reducing its intrinsic reactivity. The change in electron density is basically due to the fact that boron is substituted in the graphite structure. The second mechanism is the effect of boron on the graphitization process itself. It has been reported that boron catalyzes the graphitization reaction and more particularly that the formation of larger graphite crystals is promoted in the presence of boron. Larger graphite crystals exhibit less reactivity with respect to oxygen and $CO_2$. This is due to the decrease in the total number of accessible surface active sites, which are essentially located at the edge of the graphite crystallite. The third mechanism which has been proposed to explain the effect of boron on graphite oxidation is the formation of a boron oxide film at the surface of the graphite resulting in the blockage of active sites. It has been proposed that when a boron-doped graphite burns, the concentration of boron on the surface may increase and, in the presence of oxygen, the boron is transformed in $B_2O_3$. It is thus believed that the resulting $B_2O_3$ layer provides an oxygen-diffusion barrier reducing the $C+O_2$ reaction rate.

However, boron doping as applied above in the field of graphite composites may present some drawbacks and/or may not be suitable for carbon anodes. In most work conducted on graphite composites, the boron addition level is very high (from 1000 ppm up to several %). Such a high level of boron addition would not be recommended in carbon anode for aluminium production, since boron will most likely reduce in the bath and enter the aluminium. In addition, considering the cost of elemental boron, such a high level of addition increases the manufacturing costs. Furthermore, as mentioned above, protection of the carbon graphite against oxidation may be explained by the boron substitution in the graphite structure. Since the anode baking temperature is much lower than the graphitization temperature, no significant graphitization occurs during baking. Thus, boron substitution is not conceivable during the manufacture of carbon anodes.

Protecting the whole carbon anode with a coating such as boron oxide coating has been proposed as another strategy to limit gasification of carbon anodes by air and $CO_2$. More particularly, the carbon anode can be immersed or sprayed by an aqueous solution of $B_2O_3$, resulting in the impregnation coating of boron oxide on the whole anode surface. However, such coating approach does not appear to guarantee the long-term performance of the anode in real operation conditions. Indeed, a limited protection is achieved, basically due to the fact that the protection depth is limited and the core of the anode is not protected. It follows that, during operation, air or $CO_2$ diffuses through the porous structure of the anode and reaches the unprotected core. Once the unprotected regions behind the protected layer are gasified, the latter is removed easily from the surface, and the anode continues to react at the same rate as an unprotected one. In this regard, a deep protection through the anode could be reached by longer impregnation times. However, this approach is not economically interesting and results in longer processing times and a high uptake of boron by anode, compromising the purity of the final product.

SUMMARY

It is therefore an aim of the present invention to address the above mentioned issues.

In one aspect, there is provided a process for manufacturing a carbonaceous anode for an electrolysis cell for the production of aluminium comprising:
contacting coke particles with a boron-containing solution to obtain boron-impregnated coke particles;
mixing the boron-impregnated coke particles with coal tar pitch to form an anode paste; and
forming a green anode with the anode paste.

In one optional aspect, the process may comprise:
contacting at least a first fraction of coke particles with the boron-containing solution to obtain a first fraction of boron-impregnated coke particles;
mixing the first fraction of boron-impregnated coke particles, a second fraction of coke particles and the coal tar pitch to form the anode paste; and
forming the green anode with the anode paste.

In another optional aspect, the step of contacting may comprise contacting the first fraction of coke particles and a second fraction of coke particles with the boron-containing solution to obtain the first fraction of boron-impregnated coke particles and a second fraction of boron-impregnated coke particles, and mixing comprises mixing the first fraction of boron-impregnated coke particles, the second fraction of boron-impregnated coke particles and the coal tar pitch.

In another optional aspect, the process may comprise:
contacting the coke particles with the boron-containing solution to obtain the boron-impregnated coke particles;
grinding and sieving the boron-impregnated coke particles to obtain a first fraction of boron-impregnated coke particles and a second fraction of boron-impregnated coke particles; and
mixing the first fraction of boron-impregnated coke particles, the second fraction of boron-impregnated coke particles and the coal tar pitch to form the anode paste; and
forming the green anode with the anode paste.

In another optional aspect, the step of mixing may comprise mixing the first fraction of boron-impregnated coke particles with the coal tar pitch and then the second fraction of coke particles.

In another optional aspect, the first fraction of coke particles may comprise fine coke particles and the second fraction of coke particles comprises coarser coke particles.

In another optional aspect, the fine coke particles may have a D99 smaller than about 200 US mesh.

In another optional aspect, the fraction of fine coke particles may represent about 20 wt % or less of the total weight of the anode paste.

In another optional aspect, the boron-containing solution may be a water-based boron containing solution.

In another optional aspect, the water-based boron containing solution may comprise at least one of boron oxide and boric acid dissolved in water.

In another optional aspect, the step of contacting the coke particle may comprise spraying the boron-containing solution on the coke particles.

In another optional aspect, the step of contacting the coke particles may comprise immersing the coke particles in the boron-containing solution.

In another optional aspect, the step of contacting the coke particles with the boron-containing solution may be carried at a coke temperature below about 200° C.

In another optional aspect, the temperature of the boron-containing solution when contacting the coke particles may be between about 10° C. and 95° C.

In another optional aspect, the temperature of the boron-containing solution when contacting the coke particles may be between about 40° C. and 80° C.

In another optional aspect, the quantity and the boron content of the boron-containing solution may be chosen to reach a boron concentration in the carbonaceous anode of at most about 300 ppm.

In another optional aspect, the quantity and the boron content of the boron-containing solution may be chosen to reach a boron concentration in the carbonaceous anode of at most about 150 ppm.

In another optional aspect, the process may further comprise drying the boron-impregnated coke particles before mixing with the coal tar pitch.

In another optional aspect, the step of contacting the coke particles with the boron-containing solution may be carried out in a coke calciner.

In another optional aspect, the step of forming the green anode may comprise vibro-compacting or pressing the anode paste.

In another optional aspect, the process may further comprise baking the green anode to obtain the carbonaceous anode.

According to another aspect, there is provided a carbonaceous anode obtained by the process as defined herein.

According to another aspect, there is provided a carbonaceous anode for an electrolysis cell for the production of aluminium, comprising at least a first fraction of coke particles, a second fraction of coke particles and coal tar pitch, wherein at least the first faction of coke particles comprises boron-impregnated coke particles, the boron-impregnated coke particles being distributed throughout the carbonaceous anode.

In an optional aspect, the carbonaceous anode may be characterized in that the boron-impregnated coke particles are distributed throughout the carbonaceous anode including a core thereof.

In another optional aspect, the carbonaceous anode may be charactertized in that the first fraction of coke particles comprises fine coke particles and the second fraction of coke particles comprises coarser coke particles.

In another optional aspect, the carbonaceous anode may be charactertized in that the fine coke particles have a D99 smaller than about 200 US mesh.

In another optional aspect, the carbonaceous anode may be charactertized in that the fraction of fine coke particles represents about 20 wt % or less of the total weight of the anode paste.

In another optional aspect, the carbonaceous anode may be charactertized in that the first and second fractions of coke particles comprise boron-impregnated coke particles.

In another optional aspect, the carbonaceous anode may be charactertized in that the boron-impregnated coke particles of the first and second fractions are distributed throughout the carbonaceous anode.

In another optional aspect, the carbonaceous anode may be charactertized in that a boron concentration in the carbonaceous anode is lower than about 300 ppm.

In another optional aspect, the carbonaceous anode may be charactertized in that a boron concentration in the carbonaceous anode at most about 150 ppm.

According to another aspect, there is provided a process for pre-treating coke particles to be used in the manufacture of a carbonaceous anode for an electrolysis cell for the production of aluminium, comprising contacting the coke particles with a boron-containing solution to obtain boron-impregnated coke particles.

In an optional aspect, the pre-treatment process may comprise contacting at least a first fraction of fine coke particles to obtain a first fraction of boron-impregnated fine coke particles.

In another optional aspect, the pre-treatment process may comprise contacting a first fraction of fine coke particles and a second fraction of coarser coke particles with the boron-containing solution to obtain a first fraction of boron-impregnated fine coke particles and a second fraction of boron-impregnated coarser coke particles.

In another optional aspect, the pre-treatment process may further comprise grinding and sieving the boron-impregnated coke particles to obtain a first fraction of boron-impregnated fine coke particles and a second fraction of boron-impregnated coarser coke particles.

In another optional aspect, the fine coke particles may have a D99 smaller than about 200 US mesh.

In another optional aspect, the boron-containing solution may be a water-based boron containing solution.

In another optional aspect, the water-based boron containing solution may comprise at least one of boron oxide and boric acid dissolved in water.

In another optional aspect, the pre-treatment process may comprise contacting the coke particle by spraying the boron-containing solution on the coke particles.

In another optional aspect, the pre-treatment process may comprise contacting the coke particle by immersing the coke particles in the boron-containing solution.

In another optional aspect, the pre-treatment process may comprise contacting the coke particles with the boron-containing solution at a coke temperature below about 200° C.

In another optional aspect, the pre-treatment process may be characterized in that the temperature of the boron-containing solution when contacting the coke particles may be between about 10° C. and 95° C.

In another optional aspect, the pre-treatment process may be characterized in that the temperature of the boron-containing solution when contacting the coke particles may be between about 40° C. and 80° C.

In another optional aspect, the pre-treatment process may be characterized in that the quantity and the boron content of the boron-containing solution is chosen to reach a boron concentration in the carbonaceous anode of at most about 300 ppm.

In another optional aspect, the pre-treatment process may be characterized in that the quantity and the boron content of the boron-containing solution is chosen to reach a boron concentration in the carbonaceous anode of at most about 150 ppm.

In another optional aspect, the pre-treatment process may further comprise drying the boron-impregnated coke particles.

In another optional aspect, the pre-treatment process may comprise contacting the coke particles with the boron-containing solution to obtain the boron-impregnated coke particles, in a coke calciner.

Other objects, advantages and features of the present invention will become more apparent upon reading of the following non-restrictive description of embodiments thereof, with reference to the accompanying drawings.

BRIEF DESCRIPTION OF THE DRAWINGS

FIG. 3: Dust).

DETAILED DESCRIPTION

Figure 1:
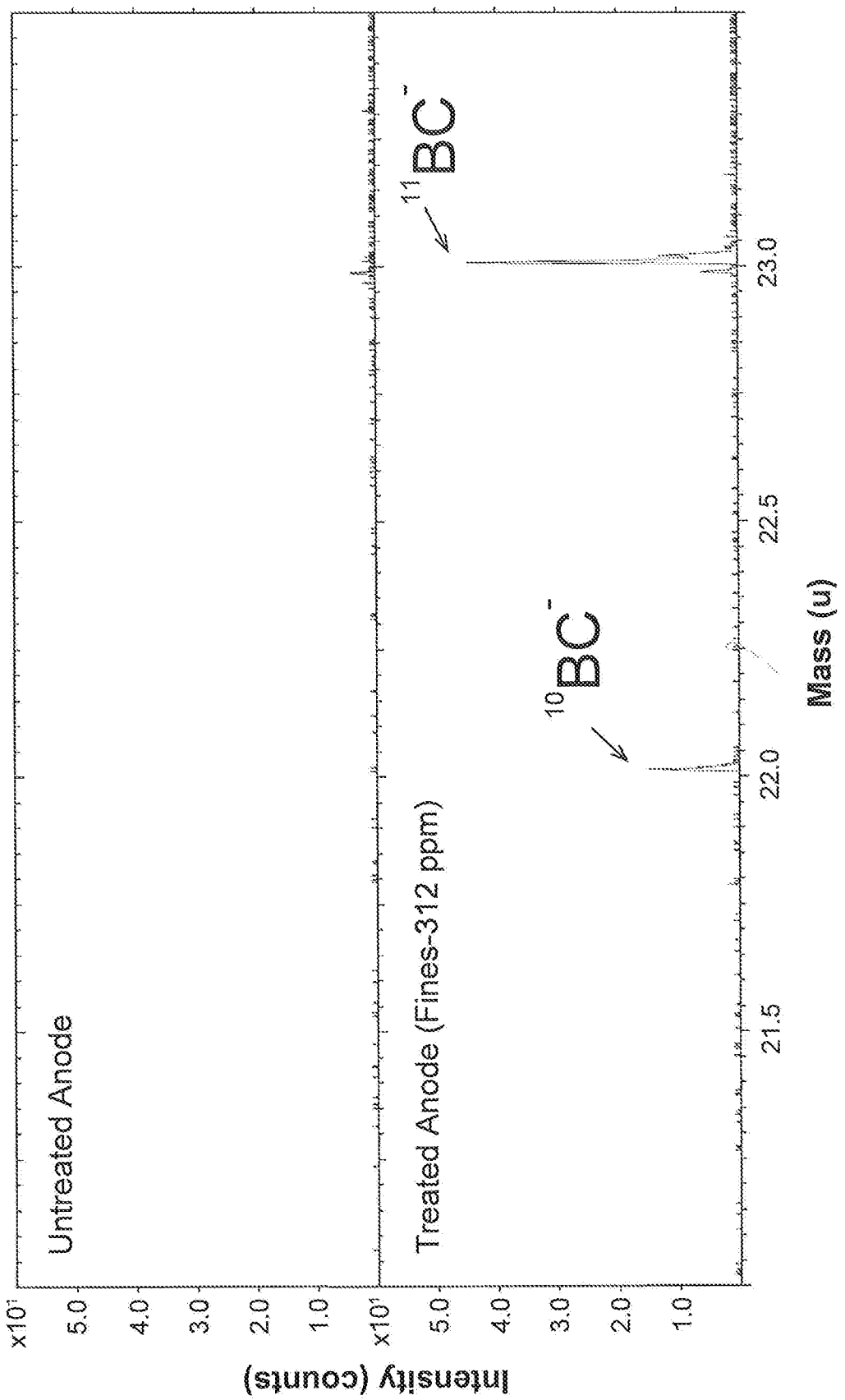
FIG. 1 represents the Time-of-Flight Secondary Ion Mass Spectroscopy (ToF-SIMS) negative ion spectra of a boron-impregnated anode obtained according to one embodiment and an untreated anode.

In the following description of the embodiments, references to the accompanying drawings are by way of illustration of an example by which the invention may be practiced. It will be understood that other aspects may be made without departing from the scope of the invention disclosed.

In the following description, the term "about" means within an acceptable error range for the particular value as determined by one of ordinary skill in the art, which will depend in part on how the value is measured or determined, i.e. the limitations of the measurement system. It is commonly accepted that a 10% precision measure is acceptable and encompasses the term "about".

According to an aspect, there is provided a process for manufacturing a carbonaceous anode for an electrolysis cell, the electrolysis cell being useful for the production of aluminium. The process comprises a pre-treatment of the coke particles used in manufacturing a carbonaceous anode, wherein the coke particles are contacted with a boron-containing solution to obtain boron-impregnated coke particles.

According to the present process, the carbonaceous anode may thus be prepared from boron-impregnated coke particles and coal tar pitch. In one embodiment, recycled anode butts may also be present as filler aggregates in the anode. The coke particles are generally derived from petroleum coke and are more particularly produced by calcining petroleum coke. One may refer to calcined petroleum coke (CPC). Coal tar pitch is used as a binder in which the coke particles are embedded. Introduced as a viscous liquid in the process for manufacturing the carbon anode, the coal tar pitch plays the role of "cement" binding together the coke particles and butt particles in the resulting anode.

In an embodiment, the carbonaceous anode may be prepared from at least one first fraction of coke particles and a second fraction of coke particles and coal tar pitch, wherein at least the first fraction of coke particles is boron-impregnated. In another embodiment, both the first and second fractions of coke particles may be boron-impregnated. According to a further embodiment, the first fraction of coke particles may comprise fine coke particles and the second fraction of coke particles may comprise large (coarser) coke particles. The fraction of large (coarser) particles may comprise particles of a size varying from about 0.15 mm to about 9.5 mm. The fraction of fine particles may comprise particles of a size of less than about 0.15 mm. The fraction of fine coke particles may also be called "fine coke". It will be understood that coke particles of various sizes may be present in each one of the first fraction and the second fraction, as soon as their size is comprised in the above mentioned ranges. In a particular embodiment, the fine coke fraction may comprise particles having a D99 smaller than about 200 US mesh.

According to the present process, in a first step, also referred to as pre-treatment step, the coke particles are thus contacted with a solution containing a boron source to obtain boron-impregnated coke particles. Then, in a further step, the boron-impregnated coke particles are mixed with the coal tar pitch to form the anode paste. The anode paste is then processed to form a green anode.

In one embodiment, the pre-treatment step thus comprises contacting the first fraction of coke particles with a solution containing a boron source such as to obtain a first fraction of boron-impregnated coke particles. In another embodiment, both the first fraction and the second fraction of coke particles may be contacted with the boron-containing solution, resulting in a first and second fractions of boron-impregnated coke particles. When the first fraction comprises fine coke particles, the contact with the boron-containing solution results in a fraction of fine boron-impregnated coke particles, and when the fraction of coarser coke particles is also contacted with the boron-containing solution, one obtains a mixture of fine and coarser boron-impregnated coke particles.

Since the surface/volume ratio of the fine particles is high, they are more vulnerable against air and $CO_2$ reactivity. Hence, in one embodiment, only the fine fractions of the coke may be impregnated with boron, prior to being mixed with pitch and large coke fractions. However, as mentioned above, both the fine coke particles and the larger ones may also be impregnated with boron. In both cases, protection of the most vulnerable part of the anode may be achieved, resulting in a deep protection within the whole anode block once formed, rather than on its surface only as is the case when a whole anode is later contacted with the boron solution.

According to the present process, in one embodiment, the solution containing the boron source which is used to impregnate the coke particles (fine only or both fine and coarser particles) may be an aqueous solution. In another embodiment, the boron source may comprise boron oxide ($B_2O_3$) or boric acid ($H_3BO_3$). Alternatively, a mixture of boron oxide and boric acid may be used to prepare the boron solution.

In another embodiment, the boron content of the impregnation solution may be comprised between about 10 g/L and about 150 g/L. In another particular embodiment, the boron content of the impregnation solution may be comprised between about 30 g/L and about 100 g/L. As will be explained in further detailed below, once the coke particles have been contacted with the boron-containing solution, water comprised in the solution is evaporated. Hence, the content of boron impregnated onto the coke particles is dependent on the boron concentration in the solution and the quantity of solution used to impregnate the coke particles. The person skilled in the art will be able to choose the quantity of solution to be contacted with the coke particles, depending on the boron concentration in the impregnation solution, to provide the required boron content in the anode. In an embodiment, the concentration and the quantity of solution are chosen to reach a boron concentration in the anode of at most about 500 ppm, for example less than about 300 ppm, or even at most 150 ppm.

Impregnation of the coke particles with the boron-containing solution may be performed by any technique known in the art. For instance, the coke particles may be immersed in the solution. Alternatively, the boron-containing solution may be sprayed onto the coke particles. Independently of the contacting technique, the temperature of the boron-containing solution when contacting the coke particles may preferably be between about 10° C. and about 95° C. The temperature of the boron-containing solution may even be chosen between about 40° C. and about 80° C. In addition, in some embodiments, the temperature of the coke particles which are contacted with the boron-containing solution may be below about 200° C. The coke temperature may preferably be comprised between about 10 and 200° C.

As mentioned above, the preparation of the boron-impregnated coke particles may be carried out by immersion in the boron-containing solution. Once the coke particles have been contacted with the impregnation solution containing boron, the impregnated particles are dried, before being mixed with the coal tar pitch, in order to evaporate the water, leaving the boron on the surface of the coke particles. Drying of the impregnated particles may also be required after spraying the boron-containing solution, depending on the coke temperature. If for instance the coke particles temperature is above 100° C., it may not be necessary to dry the particles as the solution will evaporate at the contact of particles.

In another embodiment, the coke particles may be contacted with the boron-containing solution when coming out of the coke calciner. For instance, the calcined coke particles may be contacted with the boron-containing solution in the rotary cooler of the calciner. In a particular embodiment, the coke particles may be cooled to a temperature of about 200° C. in the rotary cooler, and then contacted with the boron-containing solution. Hence, the step of contacting the coke particles with the boron-containing solution may also serve to complete their cooling.

In an embodiment, coarse coke particles which have been impregnated with the boron solution just after the calcination in the coke calciner, may be ground, e.g. in a grinding mill, to result in boron-impregnated coke particles of various particle sizes, which may then be sieved and classified by their grinding size. Hence, fine boron-impregnated coke particles may be obtained from coarser boron-impregnated coke particles, through grinding. Then, the fine boron-impregnated coke particles may be mixed with coarser non-impregnated coke particles and coal tar pitch to form the anode paste. Alternatively, the calcined coke particles which have been impregnated with the boron solution (e.g. by spraying the solution) just after the calcination in the coke calciner may be ground to obtain a fraction of boron-impregnated fine coke particles and a second fraction of coarser (large) boron-impregnated fine coke particles, which may further be mixed with coal tar pitch to form the anode paste.

The term "impregnated" as used herein, is understood to mean that the coke particles are at least covered (partially or totally) with boron through contact with the boron-containing solution. Hence, "impregnation-solution" refers to the boron-containing solution which through contact with the coke particles results in the production of coke particles that are at least covered (partially or totally) with boron. Similarly, the expression "boron-impregnated coke particles" is understood to refer to coke particles which are at least covered (partially or totally) with boron. To some extent, the boron may be absorbed into the carbon lattice of the coke particles.

In the step of preparing the anode paste, the coke particles and optionally the anode butts are mixed with the coal tar pitch. Mixing can be performed in different ways and the one skilled in the art will be able to use/adapt the known methods for obtaining the anode paste. In one embodiment, where only the fine coke particles are boron-impregnated, one may first mix the fine boron-impregnated coke particles with the coal tar to form a binder matrix and then mix the binder matrix with the coarser coke particles (and optionally the anode butts) to form the anode paste. However, it may also be possible to mix the fine boron-impregnated coke particles, the coarser coke particles, optionally the anode butts, and the coal tar pitch altogether at the same time.

If the anode is prepared using both fine and coarser boron-impregnated coke particles, the mixing can be achieved using the two possible procedures mentioned above. Namely, one can first mix the fine boron-impregnated particles with the coal tar to form the binder matrix and then mix the binder matrix with the coarser boron-impregnated coke particles and optionally the anode butts, or one can mix the fine and coarser boron-impregnated particles, optionally the anode butts, and the coal tar pitch altogether at the same time.

The content of each of the fine and coarser fractions of the coke particles used to make the anode paste may vary. In one embodiment, the fraction of fine coke particles may represent about 20 wt % or less of the total weight of the anode paste. In another embodiment, the content of pitch may vary from about 10 wt % to about 20 wt %, or about 11 wt % to about 18 wt %, for example about 13-14 wt %, based on the total weight of the anode paste (or green anode). When anode butts are used to make the anode, they can represent up to about 20 wt % of the total weight of the anode paste (or green anode).

Once the anode paste has been obtained, the next step consists in forming the green anode. Usually, the green anode is formed by compacting the anode paste, most often using vibro-compaction or pressing, during which it is deformed and densified. In the vibrocompactors, the anode paste is molded into green anode blocks. The green anode blocks may then be cooled in a water cooling system.

The final anode may be obtained through baking the green anode. The baking may be performed at temperatures around 1100-1200° C., for about 300-400 hours to increase its strength through decomposition and carbonization of the binder.

The boron concentration in the anode may vary depending on the content of boron-impregnated coke particles therein. In one embodiment, the boron concentration, expressed in boron element, is at most about 500 ppm. As previously explained, some boron may be transferred to the aluminium during the electrolysis process. In order to limit the boron transfer, it may be advantageous to also limit the boron concentration in the anode. Hence, in another embodiment, the boron loading in the anode may preferably be lower than about 300 ppm. A boron loading target of at most 150 ppm may be preferred in some embodiments.

As previously mentioned, the carbonaceous anode obtained from the present process presents a good resistivity towards air and $CO_2$ oxidation. This translates into less dusting of the anode, which in turn improves integrity of anodes throughout their life. These characteristics are due to the fact that the boron, incorporated into the anode through the impregnated coke particles, is distributed throughout the anode, not only at the surface thereof, but also in its core. Hence, the boron is dispersed within the whole anode block, resulting in a deep protection.

The following examples are provided to illustrate some properties and advantages of the anode and its manufacturing process.

EXAMPLES

Anodes have been prepared with coke particles pre-treated with boron according to the inventive process.

Two types of anodes were prepared from boron-impregnated coke particles with a boron concentration of 312 ppm in the anode. In the first one, referred to as "Treated Anode (Fines—312 ppm)", only the fine coke particles were boron-impregnated. In the second one, referred to as "Treated Anode (all coke particles—312 ppm)", all the coke particles were boron-impregnated.

In addition, two different anodes were prepared according to the inventive process in which the boron concentration was 130 ppm, including an anode referred to as "Treated Anode (Fines—130 ppm)" in which only the fine coke particles were boron-impregnated and an anode referred to as "Treated Anode (all coke particles—130 ppm)" in which all the coke particles were boron-impregnated.

The reactivity towards air and $CO_2$ of these anodes were tested and compared with i) an anode prepared with untreated coke particles (referred to as "Untreated Anode") and ii) an anode prepared with untreated coke particles, but wherein the anode paste was sprayed with a boron-containing solution (referred to as "Treated Anode (Spray)". The boron concentration in the Treated Anode (Spray) was also 130 ppm.

The electrical resistivity of the "Treated Anode (Fines) 130 ppm" was also compared with the one of the "Untreated Anode".

Example 1: Anode Preparation

The anode recipes used for the preparation of the untreated anodes and treated anodes are provided in Table 1.

The weight percentage of the coal tar pitch was 16.2 wt % of the total weight of the coke particles for all the anodes.

TABLE 1

| Particle sizes | | Weight (%) | Weight (g) |
|---|---|---|---|
| 4-8 mesh | 4699 < x < 2362 μm | 22 | 116.6 |
| 8-14 mesh | 2362 < x < 1397 μm | 10 | 53 |
| 14-30 mesh | 1397 < x < 589 μm | 11.5 | 60.95 |
| 30-50 mesh | 589 < x < 295 μm | 12.7 | 67.31 |
| 50-100 mesh | 295 < x < 147 μm | 8.8 | 46.64 |
| 100-200 mesh | 147 < x < 74 μm | 10.8 | 57.24 |
| <200 mesh (4000 BN) | x < 74 μm | 24.2 | 128.26 |
| Total mass (coke) | | 100 | 530 |
| Pitch | | 16.2 | 85.86 |
| 413 ppm $B_2O_3$ (130 ppm Boron) | | 0.0413 | 0.2544 |
| 1000 ppm $B_2O_3$ (312 ppm Boron) | | 0.1 | 0.62 |
| Total mass of the anode paste (untreated) | | | 615.86 |
| Total mass of the anode paste (treated-130 ppm) | | | 616.11 |
| Total mass of the anode paste (treated-312 ppm) | | | 616.48 |

The coke particles (fines of particle size <200 mesh only, or all coke particles) were immersed in a solution of water and $B_2O_3$ at about 80° C., wherein the quantity of $B_2O_3$ was as mentioned in Table 1, namely 0.2544 g $B_2O_3$ for the Treated Anode (Fines—130 ppm) and Treated Anode (all coke particles—130 ppm), and 0.62 g $B_2O_3$ for Treated Anode (Fines-312 ppm). Then, the mixture was placed in an oven at about 100° C. for 12 to 24 hours to allow water to evaporate.

The resulting treated coke particles, mixed with the untreated coarser particles for the preparation of the Treated Anode (Fines—130 ppm), were then preheated at 185° C. for 90 minutes. Then, solid pitch was added to the pre-heated coke particles and the resulting mixture was heated for 30 minutes at the same temperature. The blend coke particles+ pitch heated at 185° C. was then mixed at the same temperature for 10 minutes to form an anode paste, which was separated into two portions and each portion was then pressed at 150° C. during 3 minutes by applying a uniaxial pressure of 70 MPa. The resulting sample, called green anode, had a diameter of 50 mm and an approximate height of 100 mm. Prior to baking the green anodes in a muffle furnace to obtain the anodes, the green anodes were placed in an Inconel® box and covered by coke particles to protect them from air oxidation. The heating program used to bake the green anodes was as follows:

1/ from room temperature to 150° C. at a heating rate of 60° C./h for 2 hours;
2/ from 150° C. to 650° C. at a rate of 20° C./h for 25 hours;
3/ from 650° C. to 1100° C. at a rate of 50° C./h for 9 hours; and
4/ 20 hours at 1100° C.

At the end of this cycle, the furnace was switched off and the anodes therein were allowed to cool to room temperature (about 30 hours).

It is worth mentioning that the same quantity of boron oxide was used (0.2544 g) to prepare the Treated Anode (Fines—130 ppm) and the Treated Anode (all coke particles—130 ppm). Hence, in the Treated Anode (Fines—130 ppm), the boron is spread over the fine particles while in the Treated Anode (all coke particles—130 ppm), the boron is spread over the coke particle of all sizes. Of course, in the Treated Anode (Fines-130 ppm), the boron-impregnated fine particles are mixed with untreated coarser coke particles before mixing with the pitch and the boron is also spread over the entire anode at the end of the process.

Untreated anodes were prepared in the same way as mentioned above for the treated anodes except that the coke particles were not treated with the solution of boron oxide prior and were directly mixed with the pitch to form the anode paste.

The Treated Anode (Spray) was prepared in the same way as the untreated anodes up to the step of forming the anode paste. Namely, all the coke particles were preheated at 185° C. for 90 minutes, mixed with the pitch and the blend coke particles+pitch was further mixed at the same temperature for 10 minutes to form the anode paste. The anode paste was then sprayed with an aqueous solution of $B_2O_3$ containing 0.2544 g de $B_2O_3$. The small amount of water in the aqueous solution was evaporated on contact with the anode paste. The treated anode paste was then compacted as explained above to form the green anode which was baked in the same conditions as provided above.

The Treated Anode (all coke particles—312 ppm) was obtained using an untreated anode which was crushed and the resulting particles were immersed in an aqueous solution. More particularly, 100 g untreated anode was crushed and the resulting particles were immersed in an aqueous solution containing 0.1 g of $B_2O_3$. Then, the mixture was placed in an oven at about 100° C. for 12 to 24 hours to allow water to evaporate.

Example 2: Anode Characterization

Time-of-Flight Secondary Ion Mass Spectroscopy (ToF-SIMS) was used to reveal the presence of boron in the Treated Anode (Fines—312 ppm). Comparison was made with the Untreated Anode. The negative ion spectra for both anodes are represented in FIG. 1. The peak at m/z 23 is attributed to BC⁻ and was confirmed by the presence of the isotope $^{10}B$ at m/z 22 for the Treated Anode (Fines—312 ppm). No peak is present for the Untreated Anode, which confirms the presence of boron in the treated anode after the baking process. This spectrum also indicates that boron exists in another form rather than oxides in the Treated Anode (Fines—312 ppm), which could explain that boron blocks the active sites of carbon against the penetration of oxygen attack during the reaction.

The level of impurities of the anodes prepared according to the inventive process, i.e. Treated Anode (Fines—150 ppm) and Treated Anode (all coke particles—150 ppm), was determined by X-Ray fluorescence spectroscopy (XRF) (Axios Max™, Panalytical, USA) according to the standard test method ASTM D4326-06. The mean crystallite height (Lc) of the samples was determined by X-Ray diffraction (XRD) (PW 1800™, Phillips, Germany) applying the ISO 20203 standard method. In addition, the apparent density of the anodes was determined according to the ISO 12985-1 standard method (Carbonaceous materials used in the production of aluminium-Baked anodes and cathode blocks—Part 1: Determination of apparent density using a dimensions method).

The results were compared with the results obtained for the Untreated Anode and Treated Anode (Spray). The results are provided in Table 2.

TABLE 2

Sample properties of baked anodes—Apparent density, crystallite size and chemical composition

| Sample | Apparent density (g/cc) | XRD Lc (nm) | XRF S (%) | Si (ppm) | Fe (ppm) | V (ppm) | NI (ppm) | Na (ppm) | Ca (ppm) |
|---|---|---|---|---|---|---|---|---|---|
| Untreated Anode | 1.53 ± 0.02 | 2.95 | 1.86 | 277 | 670 | 377 | 231 | 68 | 200 |
| Treated Anode (Spray) | 1.47 ± 0.03 | 2.89 | 1.90 | 293 | 675 | 383 | 236 | 68 | 215 |
| Treated Anode (Fines-150 Ppm) | 1.52 ± 0.01 | 2.95 | 1.88 | 291 | 710 | 389 | 239 | 73 | 219 |
| Treated Anode (all coke particles-150 ppm) | 1.52 ± 0.00 | 2.98 | 1.87 | 275 | 636 | 388 | 238 | 74 | 195 |

XRF test results of the tested anodes show that the concentrations of S, Si, Fe, V, Ni, Na and Ca in the Treated Anodes with boron are almost equal to the untreated one. XRD analysis results show that there is no noticeable variation in the $L_C$ values in the Treated Anodes compared to untreated one.

Example 3: Air Reactivity Measurements

Air reactivity of the anodes was measured according to the ISO 12989-1 standard method. The results are represented in FIGS. 2 and 3.

Figure 2:
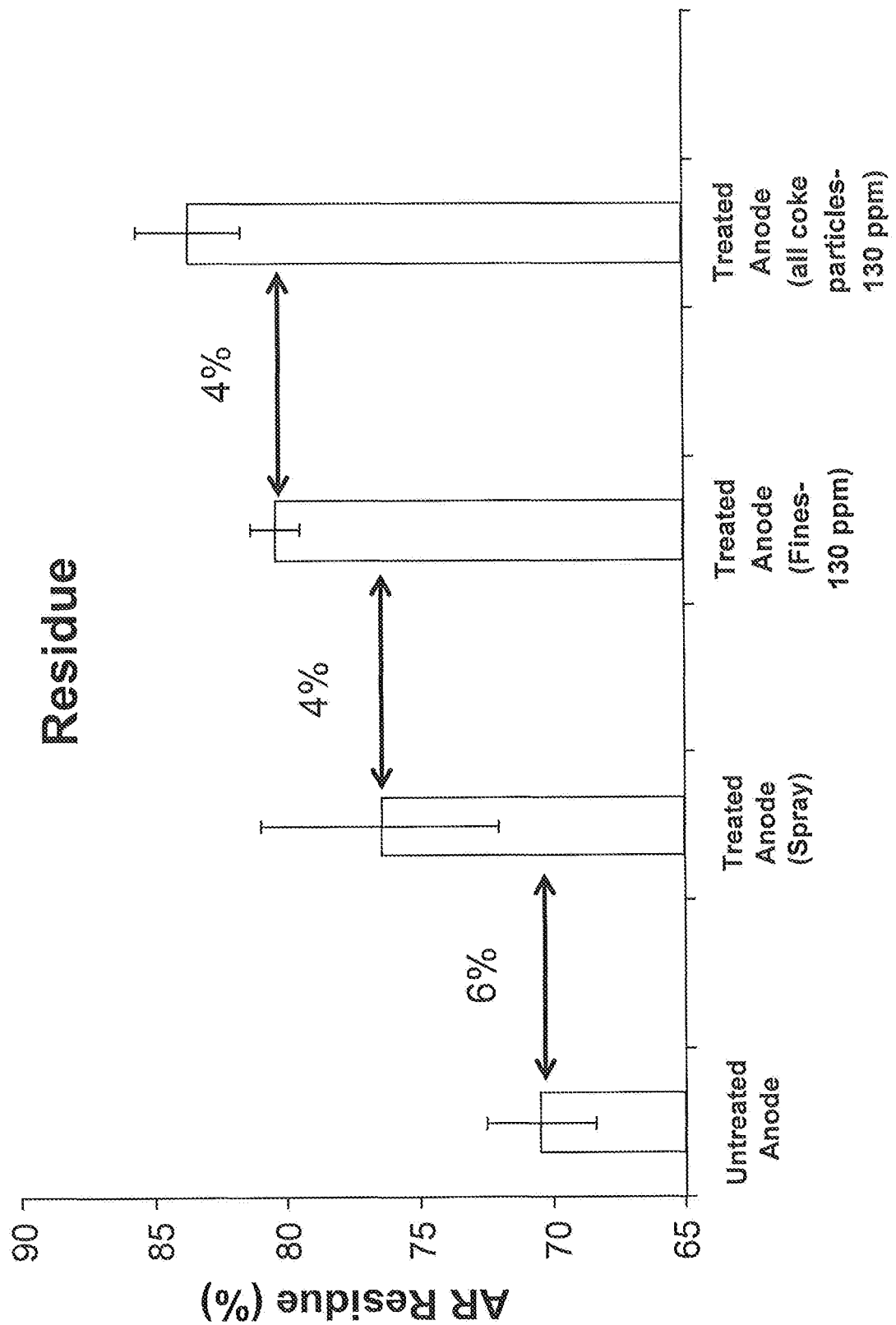
FIGS. 2 and 3 represent the results of the carbon air reactivity test performed on boron-impregnated anodes obtained according to various embodiments and an untreated anode (FIG. 2: Air reactivity Residue.

FIG. 2 shows that anodes prepared using boron-impregnated particles (fine only or all coke particles) allows decreasing air reactivity of the anode compared to the untreated anode and even the spray treated anode. The impregnation of all coke particles fraction by boron appears superior for inhibiting air reactivity of the anode.

Figure 3:
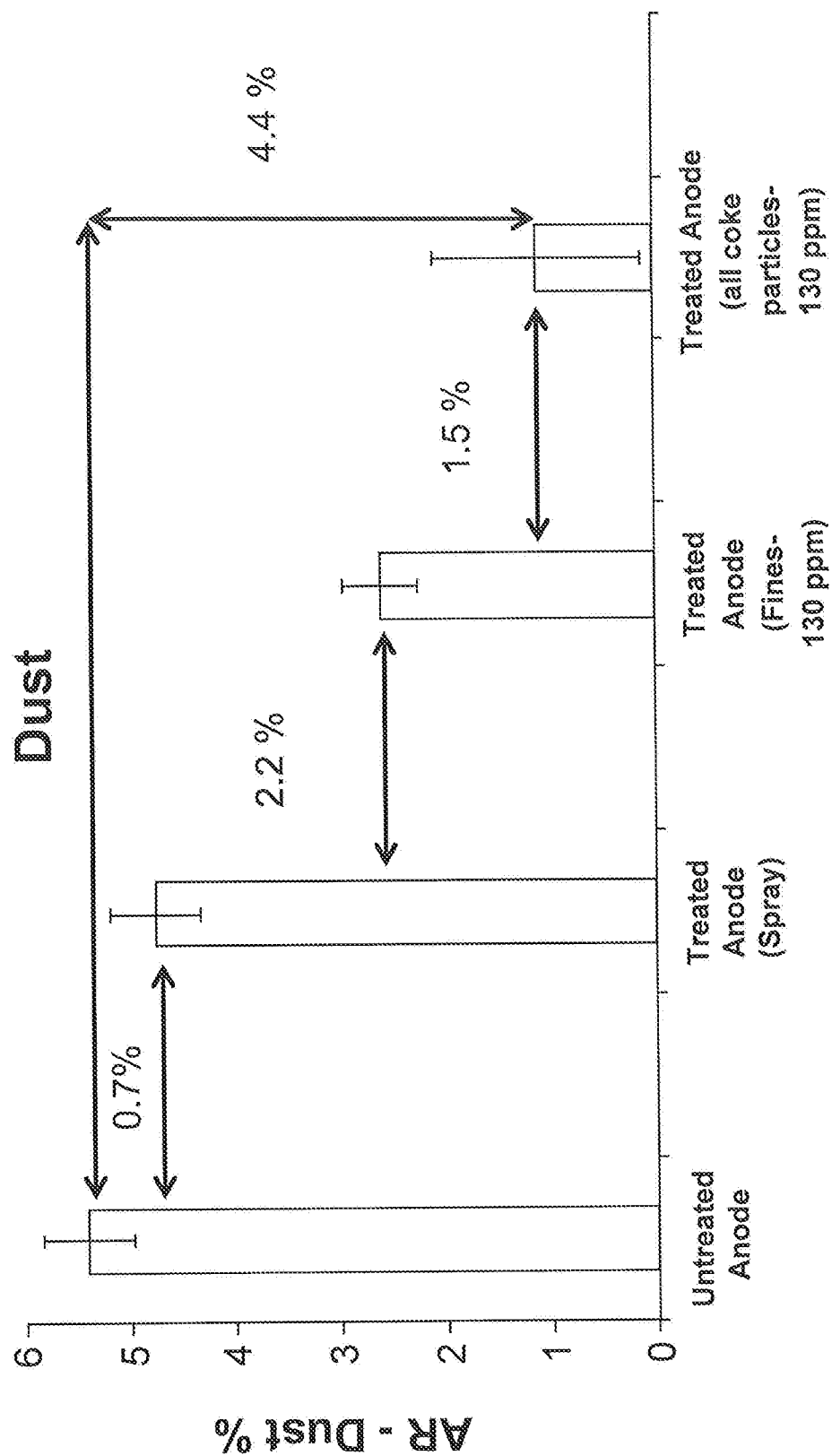

FIG. 3 shows that that anodes prepared using boron-impregnated particles (fine only or all coke particles) allows decreasing dusting of the anode compared to the untreated anode and even the spray treated anode. The impregnation of all coke particles fraction by boron appears superior for inhibiting dusting of the anode.

Example 4: $CO_2$ Reactivity Measurements

Reactivity towards $CO_2$ of the treated and untreated anodes was measured using a thermogravimetric method as detailed below.

The $CO_2$ reactivity tests were conducted in isothermal conditions at 960° C. using thermal analyzer (Netzsch STA 449 F3 Jupiter™, Germany). An alumina sleeve (crucible with a low height) with an external diameter of 6.45 mm and a height of 1.82 mm was used for all TGA measurements. The optimized quantity of sample (around 2 mg) was deposited into the sleeve and placed into the TGA. The temperature was then increased by 30° C./min from room temperature to the reaction temperature (960° C.). The sample was protected by a $N_2$ atmosphere (Praxair, 99.995%, USA, flow rate: 100 ml/min) before the gasification of the sample by $CO_2$ gas. When the temperature reached (960° C.), the system was allowed to stabilize during 15 min under $N_2$ atmosphere. Then, the $N_2$ (flow protecting the sample) was decreased to 20 ml/min and augmented with 100 ml/min $CO_2$ gas (Praxair, 99.9%, USA). After the $CO_2$ reactivity step, which lasted between 60 and 200 min, the $CO_2$ was replaced by $N_2$ and the furnace was switched off and left to cool to room temperature (F. Chevarin, L. Lemieux, D. Picard, D. Ziegler, M. Fafard, H. Alamdari, Characterization of carbon anode constituents under $CO_2$ gasification: A try to understand the dusting phenomenon, Fuel, Volume 156, 15 Sep. 2015, Pages 198-210).

Figure 4:
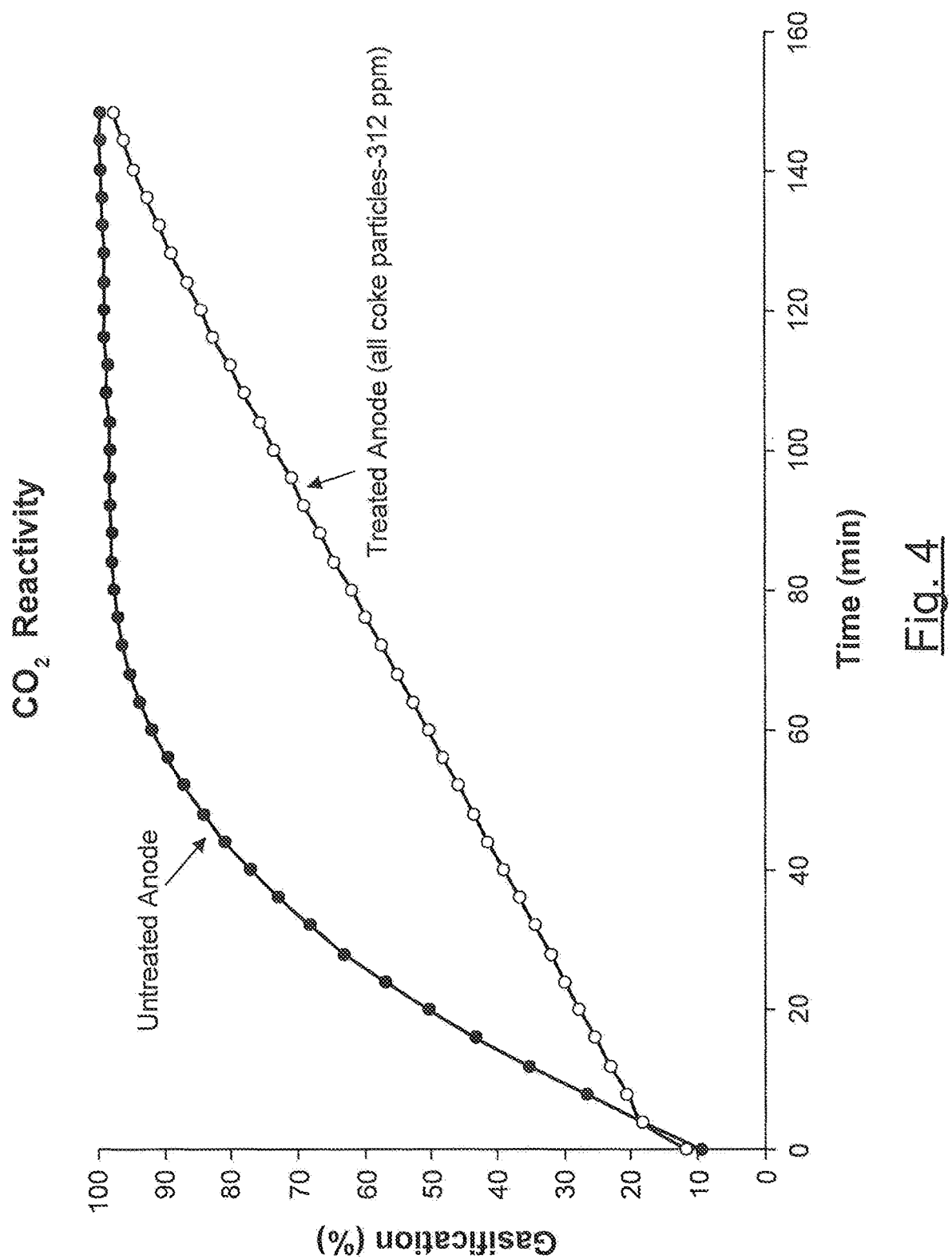
FIG. 4 represents the results of the $CO_2$ reactivity test performed on a boron-impregnated anode obtained according to one embodiment and an untreated anode.

The results are provided in FIG. 4, which represent the gasification percentage versus reaction time for the Treated Anode (all coke particles—312 ppm) and the Untreated Anode, under $CO_2$ atmosphere at 960° C.

As can be noticed in FIG. 4, the Untreated Anode reacts and looses weight at a much faster rate than the Treated Anode (all coke particles—312 ppm). This shows that impregnation with boron of the coke particles inhibits reactivity towards $CO_2$ of the resulting anode.

Example 5: Electrical Resistivity Measurements

Electrical resistivity of the Treated Anode (Fines—130 ppm) and the Untreated Anode was measured according to the ISO 11713 standard method. The results are represented in FIG. 5.

Figure 5:
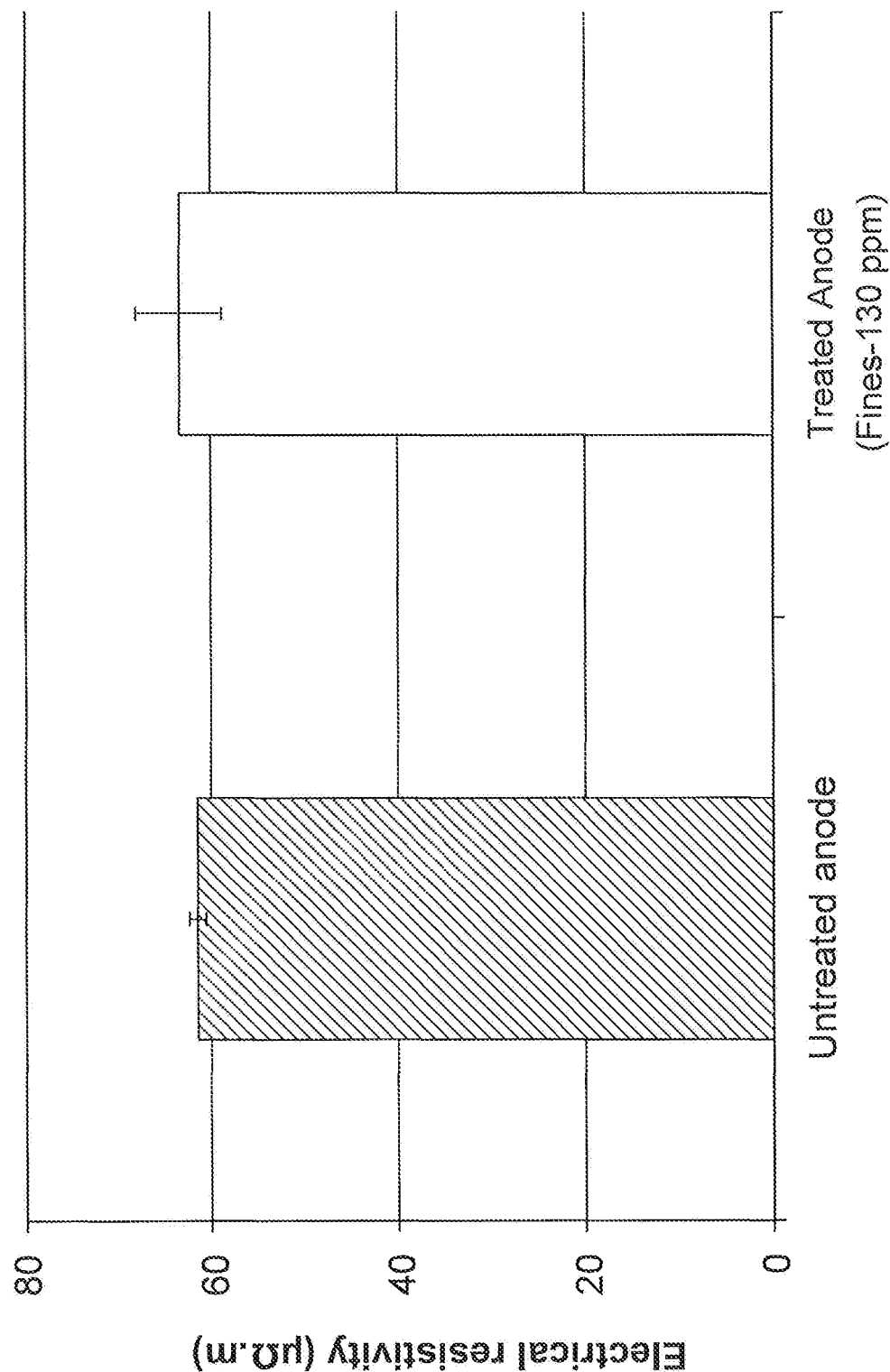
FIG. 5 represents the results of the electrical resistivity test performed on a boron-impregnated anode obtained according to one embodiment and an untreated anode.

As can be seen from FIG. 5, the anode electrical resistivity of both anodes is comparable. Hence, the anode electrical resistivity was not affected by the impregnation of the coke particles with boron.

The above-described embodiments and examples are considered in all respect only as illustrative and not restrictive, and the present application is intended to cover any adaptations or variations thereof, as apparent to a person skilled in the art. Of course, numerous other modifications could be made to the above-described embodiments without departing from the scope of the invention, as apparent to a person skilled in the art.

The scope of the invention is therefore intended to be limited solely by the scope of the appended claims.

The invention claimed is:

1. A process for manufacturing a carbonaceous anode for an electrolysis cell for the production of aluminium comprising:
    contacting coke particles with a boron-containing solution to obtain boron-impregnated coke particles;
    mixing the boron-impregnated coke particles with coal tar pitch to form an anode paste; and
    forming a green anode with the anode paste.

2. The process of claim 1, comprising:
    contacting at least a first fraction of coke particles with the boron-containing solution to obtain a first fraction of boron-impregnated coke particles;
    mixing the first fraction of boron-impregnated coke particles, a second fraction of coke particles and the coal tar pitch to form the anode paste; and
    forming the green anode with the anode paste.

3. The process of claim 2, wherein contacting comprises contacting the first fraction of coke particles and a second fraction of coke particles with the boron-containing solution to obtain the first fraction of boron-impregnated coke particles and a second fraction of boron-impregnated coke particles, and mixing comprises mixing the first fraction of boron-impregnated coke particles, the second fraction of boron-impregnated coke particles and the coal tar pitch.

4. The process of claim 1, comprising:
    contacting the coke particles with the boron-containing solution to obtain the boron-impregnated coke particles;
    grinding and sieving the boron-impregnated coke particles to obtain a first fraction of boron-impregnated coke particles and a second fraction of boron-impregnated coke particles; and
    mixing the first fraction of boron-impregnated coke particles, the second fraction of boron-impregnated coke particles and the coal tar pitch to form the anode paste; and
    forming the green anode with the anode paste.

5. The process of claim 2, wherein the first fraction of coke particles comprises fine coke particles and the second fraction of coke particles comprises coarser coke particles.

6. The process of claim 5, wherein the fraction of fine coke particles represents about 20 wt % or less of the total weight of the anode paste.

7. The process of claim 1, wherein the boron-containing solution is a water-based boron containing solution which comprises at least one of boron oxide and boric acid dissolved in water.

8. The process of claim 1, wherein contacting the coke particles with the boron-containing solution is carried at a coke temperature below about 200° C.

9. The process of claim 1, wherein a temperature of the boron-containing solution when contacting the coke particles is between about 10° C. and 95° C.

10. The process of claim 1, wherein the quantity and the boron content of the boron-containing solution is chosen to reach a boron concentration in the carbonaceous anode of at most about 300 ppm.

11. The process of claim 1, further comprising drying the boron-impregnated coke particles before mixing with the coal tar pitch.

12. The process of claim 1, wherein contacting the coke particles with the boron-containing solution is carried out in a coke calciner.

13. The process of claim 1, further comprising baking the green anode to obtain the carbonaceous anode.

14. The process of claim 2, wherein mixing comprises mixing the first fraction of boron-impregnated coke particles with the coal tar pitch and then the second fraction of coke particles.

15. The process of claim 5, wherein the fine coke particles have a D99 smaller than about 200 US mesh.

16. The process of claim 1, wherein a temperature of the boron-containing solution when contacting the coke particles is between about 40° C. and 80° C.

17. A carbonaceous anode for an electrolysis cell for the production of aluminium, comprising at least a first fraction of coke particles, a second fraction of coke particles and coal tar pitch, wherein at least the first faction of coke particles comprises boron-impregnated coke particles, the boron-impregnated coke particles being distributed throughout the carbonaceous anode, and wherein the first fraction of coke particles comprises fine coke particles and the second fraction of coke particles comprises coarser coke particles and a boron concentration in the carbonaceous anode is lower than about 300 ppm.

18. The carbonaceous anode of claim 17, wherein the boron-impregnated coke particles are distributed throughout the carbonaceous anode including a core thereof.

19. The carbonaceous anode of claim 17, wherein the fine coke particles have a D99 smaller than about 200 US mesh and the fraction of fine coke particles represents about 20 wt % or less of the total weight of the anode paste.

20. The carbonaceous anode of claim 17, wherein the first and second fractions of coke particles comprise boron-impregnated coke particles that are distributed throughout the carbonaceous anode.

* * * * *